US011182418B2

(12) United States Patent
Meng (10) Patent No.: US 11,182,418 B2
(45) Date of Patent: Nov. 23, 2021

(54) MEDIA CONTENT RECOMMENDATION METHOD AND APPARATUS AND STORAGE MEDIUM

(71) Applicant: TENCENT TECHNOLOGY (SHENZHEN) COMPANY LIMITED, Shenzhen (CN)

(72) Inventor: Lingmin Meng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 130 days.

(21) Appl. No.: 15/929,122

(22) Filed: Apr. 10, 2019

(65) Prior Publication Data
US 2019/0236091 A1    Aug. 1, 2019

Related U.S. Application Data

(63) Continuation of application No. PCT/CN2018/080785, filed on Mar. 28, 2018.

(30) Foreign Application Priority Data

Mar. 28, 2017 (CN) .......................... 201710191230.4

(51) Int. Cl.
*G06F 16/00* (2019.01)
*G06F 16/435* (2019.01)
(Continued)

(52) U.S. Cl.
CPC ............ *G06F 16/435* (2019.01); *G06F 16/00* (2019.01); *G06F 16/24578* (2019.01); *G06F 16/9535* (2019.01)

(58) Field of Classification Search
CPC ........... G06F 16/9535; G06F 16/24578; G06F 16/435; G06F 16/639; G06F 16/4387; G06F 16/635; G06F 16/735; G06F 16/00
See application file for complete search history.

(56) References Cited

U.S. PATENT DOCUMENTS 6,112,186 A * 8/2000 Bergh .................... G06Q 30/02
705/7.32
7,617,127 B2 * 11/2009 Hunt ..................... G06Q 30/02
705/26.61
(Continued)

FOREIGN PATENT DOCUMENTS

CN         103345503 A      10/2013
CN         103995823 A       8/2014
(Continued)

OTHER PUBLICATIONS

Written Opinion and International Search Report dated Jul. 2, 2018 in PCT/CN2018/080785 with concise English translation.
(Continued)

*Primary Examiner* — Hung Q Pham
(74) *Attorney, Agent, or Firm* — Oblon, McClelland, Maier & Neustadt, L.L.P.

(57) ABSTRACT

A method of media content recommendation is described. The method can include receiving rating records of a plurality of users for a plurality of media contents. The rating records can include rating values provided by the plurality of users for the media contents. The plurality of users includes a first user and a plurality of second users. A confidence level of the first user for each of the second users is determined according to the plurality of rating records. A subset of the confidence levels satisfying a predetermined condition is selected from the determined confidence levels of the first user for the second users. The subset of the confidence levels is associated with a subset of the second users. A recommended media content to be provided to the first user is determined from the media contents that have been rated by the subset of the second users.

18 Claims, 3 Drawing Sheets

(51) Int. Cl.
*G06F 16/9535* (2019.01)
*G06F 16/2457* (2019.01)

(56) References Cited

U.S. PATENT DOCUMENTS

| | | | |
|---|---|---|---|
| 9,392,314 B1* | 7/2016 | Lewis | H04N 21/4668 |
| 9,576,029 B2* | 2/2017 | Berkhim | G06F 16/9535 |
| 10,102,559 B1* | 10/2018 | Jain | G06Q 30/0631 |
| 2003/0088480 A1* | 5/2003 | Berghofer | G06Q 30/0601 |
| | | | 705/26.1 |
| 2005/0033657 A1* | 2/2005 | Herrington | G06Q 30/0631 |
| | | | 705/26.7 |
| 2007/0239554 A1* | 10/2007 | Lin | G06Q 30/0212 |
| | | | 705/26.7 |
| 2009/0083258 A1* | 3/2009 | Koren | G06Q 30/0631 |
| 2009/0132520 A1* | 5/2009 | Nemeth | G06F 16/48 |
| 2010/0088265 A1* | 4/2010 | Pohl | G06Q 30/02 |
| | | | 706/46 |
| 2011/0179019 A1* | 7/2011 | Amer-Yahia | G06F 16/9535 |
| | | | 707/723 |
| 2013/0097056 A1 | 4/2013 | Sun et al. | |
| 2015/0081471 A1* | 3/2015 | Cheng | G06Q 30/0631 |
| | | | 705/26.7 |
| 2016/0117329 A1* | 4/2016 | Busey | G06F 16/287 |
| | | | 707/726 |
| 2016/0154887 A1* | 6/2016 | Zhao | G06F 16/4387 |
| | | | 707/727 |
| 2016/0232540 A1 | 8/2016 | Gao et al. | |

FOREIGN PATENT DOCUMENTS

| | | |
|---|---|---|
| CN | 104156436 A | 11/2014 |
| CN | 105340286 A | 2/2016 |
| CN | 106126586 A | 11/2016 |
| CN | 106484876 A * | 3/2017 |

OTHER PUBLICATIONS

Chinese Office Action dated Sep. 15, 2021 in Chinese Application No. 20170191230.4, 13 pgs.

Wang Quan, et al., Friend Recommendation Algorithm Considering Users' Confidence Asymmetry, Peak Data Science, vol. 5, No. 3, Dec. 2016, 7 pgs.

* cited by examiner

FIG. 4

MEDIA CONTENT RECOMMENDATION METHOD AND APPARATUS AND STORAGE MEDIUM

RELATED APPLICATION

This application is a continuation of International Application No. PCT/CN2018/080785, filed on Mar. 28, 2018, which claims priority to Chinese Patent Application No. 201710191230.4 filed on Mar. 28, 2017. The entire disclosures of the prior applications are hereby incorporated by reference in their entirety.

FIELD OF THE TECHNOLOGY

This application relates to the field of Internet technologies.

BACKGROUND OF THE DISCLOSURE

With the development of the Internet technologies, more and more human activities, such as web browsing, instant messaging, shopping, advertising, online gaming, can be performed on the Internet. With popularization of the Internet technologies, personalized recommendation systems have been widely adopted on online electronic business platforms. The so-called personalized recommendation is to recommend information and products to a user according to interest characteristics and purchasing behaviors of the user, so as to reduce time consumed by the user for searching for relevant information or products.

SUMMARY

A media content recommendation method is described. In an embodiment, the method can include receiving, by processing circuitry, rating records of a plurality of users for a plurality of media contents. The rating records can include rating values provided by the plurality of users for the media contents. The plurality of users includes a first user and a plurality of second users. A confidence level of the first user for each of the second users is determined according to the plurality of rating records. A subset of the confidence levels satisfying a predetermined condition is selected from the determined confidence levels of the first user for the second users. The subset of the confidence levels is associated with a subset of the second users. A recommended media content to be provided to the first user is determined from the media contents that have been rated by the subset of the second users.

An apparatus for media content recommendation is described. In an embodiment, the apparatus can include processing circuitry configured to receive rating records of a plurality of users for a plurality of media contents. The rating records can include rating values provided by the plurality of users for the media contents. The plurality of users includes a first user and a plurality of second users. The processing circuitry can be further configured to determined a confidence level of the first user for each of the second users according to the plurality of rating records, and select a subset of the confidence levels satisfying a predetermined condition from the determined confidence levels of the first user for the second users. The subset of the confidence levels is associated with a subset of the second users. A recommended media content to be provided to the first user is determined from the media contents that have been rated by the subset of the second users.

A non-transitory computer-readable medium is provided. The medium stores a program executable by a processor to perform the method of media content recommendation.

BRIEF DESCRIPTION OF THE DRAWINGS

To describe the technical solutions of the embodiments of this application or the related technology more clearly, the following briefly introduces the accompanying drawings required for describing the embodiments or the related technology. The accompanying drawings in the following description show only some embodiments of this application, and a person of ordinary skill in the art may still derive other drawings from these accompanying drawings.

DESCRIPTION OF EMBODIMENTS

The technical solutions in the embodiments of this application will be described in the following with reference to the accompanying drawings in the embodiments of this application. The embodiments to be described are only some rather than all of the embodiments of this application. All other embodiments obtained by a person of ordinary skill in the art based on the embodiments of this application shall fall within the protection scope of this application.

Figure 1:
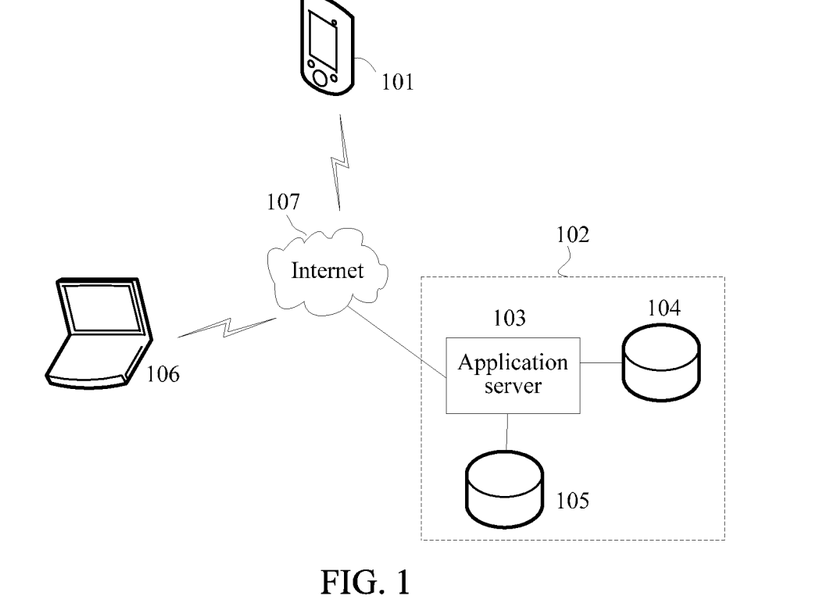
FIG. 1 is a diagram of a system used in an embodiment of the disclosure.

This application provides embodiments of an Internet-based media content recommendation method. FIG. 1 shows a system implementing the method according to some embodiments. As shown in FIG. 1, the system includes: an application (APP) client 101, a media content providing platform 102, and a media content provider client 106. The entities can perform communication through the Internet 107. The media content providing platform 102 includes an application server 103, a record database 104 for storing, for example, information of media contents accessed by users, and a rating database 105 for storing rating information of media contents rated by users.

In an embodiment, a terminal user may use the application client 101 to access the application server 103 in the media content providing platform 102, for example, to browse a web page or view an online video. When the user uses the application client 101 to access the application server 103, the application client 101 may report an access event of the user to the application server 103, and the application server 103 stores access event related data (e.g., which media content has been accessed) of the user into the user access record database 104. When the user uses the application client 101 to access the application server 103, the user may further rate a media content presented on the application client 101. For example, on the application client, a star rating option is presented below the media content accessed by the user, the user rates the media content by selecting a specific number of stars, and the application client obtains, according to 1 to 5 stars provided by the user for the media content, a corresponding rating provided by the user for the media content. The application client 101 may report the rating provided by the user for the media content to the application server 103, and the application server 103 stores the rating provided by the user for the media content into the rating database 105. While reporting access event related data and related rating information of the user, the application client 101 may send a media content providing request to the media content providing platform 102. The media content providing platform 102 may provide a media content matching the media content providing request to the application client 101. By using the media content provider client 106, a media content provider may upload a material of a media content that the media content provider intends to transmit to the media content providing platform 102, to generate a corresponding media content for providing.

In an embodiment, when the foregoing media content is a video, the system shown in FIG. 1 may be a system for recommending a video. The media content providing platform 102 may be a video providing platform, the media content provider may be a video maker, the application client 101 is a video APP, and the application server 103 is a video server. When a user views a video on the video APP, the video that has been accessed by the user is reported to the video server. The video server stores the video into the access record database 104. When the user rates the viewed video, the video APP reports the rating provided by the user for the video to the video server. The server stores the rating into the rating database 105. When the user views a video on the video APP, the video APP sends a video providing request to the media content providing platform 102, and the media content providing platform 102 obtains a to-be-provided media content according to some recommendation algorithms, and sends a link of the media content to the video APP, so that the video APP can obtain and present a video content corresponding to a selected video.

In some examples, a recommendation algorithm is a collaborative filtering (CF) recommendation algorithm. A CF can be used to recommend items to users according to their prior preferences and choices of users having similar interests. Collaborative filtering can be algorithmically classified into item-based collaborative filtering and user-based collaborative filtering. The item-based collaborative filtering evaluates a similarity between items by using ratings provided by a user for different items, and makes a recommendation based on the similarity between items. The user-based collaborative filtering evaluates a similarity between users by using ratings provided by different users for an item, and makes a recommendation based on the similarity between users.

In some examples, a recommendation is made for a user by using a user-based collaborative filtering algorithm. For example, a similarity between users is evaluated by using ratings provided by different users for an item, and a recommendation is made based on the similarity between users.

However, degrees of impact between users thus calculated are the same. For example, if a calculated similarity between a user A and a user B is 0.7, during recommendation, impact of the user A on the user B and impact of the user B on the user A are the same and are both 0.7. This is not accurate because degrees of impact and confidence levels between people are asymmetric.

Figure 2:
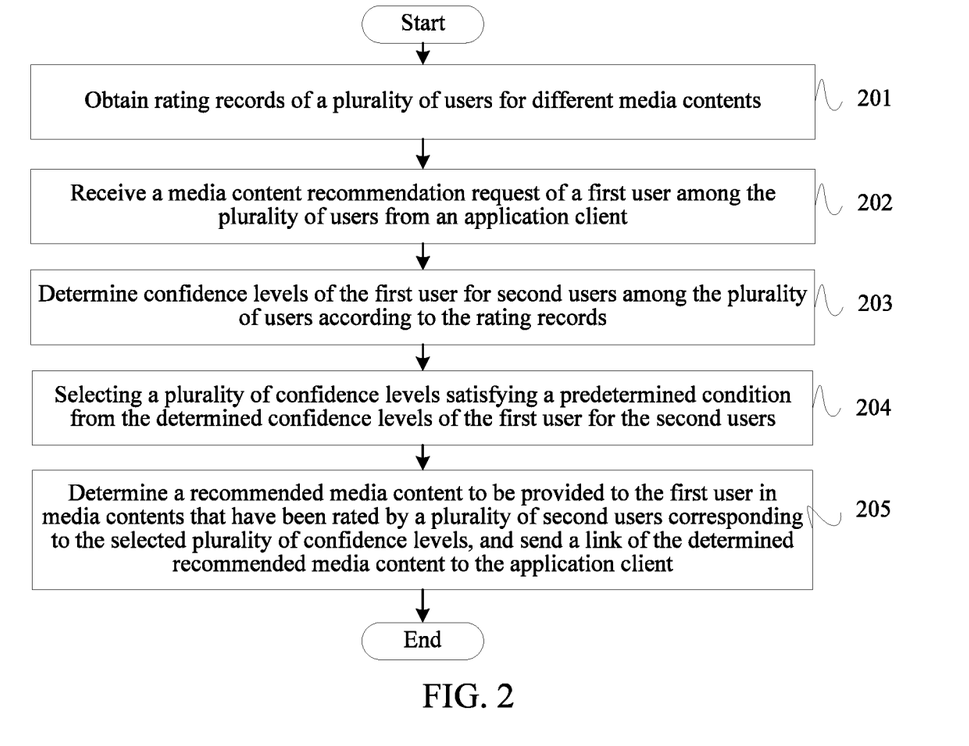
FIG. 2 is a flowchart of a media content recommendation process according to an embodiment of the disclosure.

Corresponding to the foregoing technical problem, this disclosure provides a media content recommendation method. The method may be applied to the application server 103 in the media content providing platform 102. As shown in FIG. 2, in an embodiment, the method includes the following steps:

Step 201: Obtain rating records of a plurality of users for different media contents.

When users access media contents on the application client 101, the users may rate the accessed media contents to comment on the media contents. The application client uploads ratings provided by the users for the media contents to the application server 103, and the application server 103 stores the ratings into the rating database 105. The ratings provided by the users for the media contents are shown in Table 1:

TABLE 1

| $W_{j,k}$ | $i_1$ | $i_2$ | $i_3$ | $i_4$ | $i_5$ | $i_6$ | $i_7$ | $i_8$ | $i_9$ | $i_{10}$ |
|---|---|---|---|---|---|---|---|---|---|---|
| $u_1$ | 5 | 4 | 5 | 0 | 0 | 0 | 0 | 0 | 0 | 0 |
| $u_2$ | 5 | 0 | 0 | 5 | 4 | 5 | 4 | 5 | 0 | 0 |
| $u_3$ | 4 | 5 | 0 | 4 | 4 | 3 | 4 | 0 | 0 | 0 |

$i_1$ to $i_{10}$ represent the media contents, $u_1$, $u_2$, and $u_3$ represent a user $u_1$, a user $u_2$, and a user $u_3$, and $W_{j,k}$ represents a rating provided by a user $u_j$ for a media content $i_k$. The media content identified as 0 in Table 1 represents that no user rates the corresponding media content.

Step 202: Receive a media content recommendation request of a first user among the plurality of users from an application client.

For example, when a user accesses a media content on the application client 101, the application client 101 sends a media content recommendation request to the media content providing platform 102. During historical access of the user to media contents, the application client uploads ratings provided by the user for accessed media contents to the application server 103 in the media content providing platform 102. The rating database 105 stores rating records of the user for the accessed media contents. For example, for a movie media content, when a user rates a viewed movie on a video APP, the video APP uploads the rating provided by the user for the movie to a video server, the video server stores the rating into the rating database, and the rating database also stores ratings provided by other users for the movie. When the user logs in to the video APP again to view a movie, the video server may recommend a movie to the user based on historical ratings provided by the user for viewed movies and historical movie ratings provided by other users.

In one example, for a second user in the plurality of users in the rating records, a support degree of the first user for the second user is calculated. The support degree means a degree to which users can support each other in terms of ratings, and the support degrees are different between users. A support degree between two users is constructed by using a number of media contents that have been rated by the two users and that have similar ratings by the two users, and numbers of media contents that have been respectively rated by one of the two users. Because the numbers of media contents respectively rated by the two users are different, and the numbers of media contents that that have been rated by the two users and that have similar ratings are the same, constructed user support degrees are asymmetric to each other. That is, a support degree of the user A for the user B is different from a support degree of the user B for the user A. For example, a value of the support degree can be set to a value from 0 to 1. A confidence level of the first user for the second user can be determined according to the support degree and a similarity.

Step 203: Determine confidence levels of the first user for second users among the plurality of users according to the rating records, the confidence level of the first user for any second user being used for representing an acceptance degree of the first user for rating results of the second user for different media contents.

In an embodiment, in a process of determining a confidence level of the first user for a second user, the confidence level of the first user for the second user is determined according to ratings provided by the first user for media contents and ratings provided by the second user for media contents in the rating records. The confidence level is used for representing an acceptance degree of the first user for rating results of the second user for the media contents. The more the rating results of the second user for the media contents are similar to the rating results of the first user for the media contents, the higher the confidence level of the first user for the second user. The confidence level of the first user for the second user is related to a proportion (a ratio) of a number of media contents for which ratings provided by the first user and the second user are similar to a number of media contents that have been rated by the first user. Because the number of media contents that have been rated by the first user may be different from a number of media contents that have been rated by the second user, the confidence level of the first user for the second user may be different from a confidence level of the second user for the first user. This favorably represents asymmetry of confidence between people. In addition, the confidence level of the first user for the second user is also related to a rating similarity between the first user and the second user.

Step 204: Select a plurality of confidence levels satisfying a predetermined condition from the determined confidence levels of the first user for the second users.

In an embodiment, a plurality of confidence levels satisfying a predetermined condition is selected from the determined confidence levels of the first user for the second users. Specifically, a plurality of confidence levels satisfying a predetermined condition is selected from the confidence levels of the first user for the second users obtained in step 203. The predetermined condition may be a specified threshold, and a confidence level exceeding the threshold is considered to satisfy the predetermined condition. In some examples, the predetermined condition may be ranking the calculated confidence levels in descending order, and selecting top N confidence levels.

Step 205: Determine a recommended media content to be provided to the first user in media contents that have been rated by a plurality of second users corresponding to the selected plurality of confidence levels, and send a link of the determined recommended media content to the application client.

In an embodiment, a recommended media content to be provided to the first user is determined in media contents that have been rated by a plurality of second users corresponding to the selected plurality of confidence levels, and a link of the determined recommended media content is sent to the application client. First, a plurality of second users corresponding to the selected plurality of confidence levels is determined, so as to use a media content that has been rated by the plurality of second users as a recommended media content for the first user, and the media content providing platform 102 sends a link of the determined media content to a client of the first user. In some examples, after the media contents that have been rated by the plurality of second users are determined, the media content may be further filtered. The media contents obtained after filtration are used as recommended media contents for the first user. For example, a media content having a relatively high rating provided by the plurality of second users is used as the recommended media content.

According to the media content recommendation method provided by this application, the confidence level of the first user for the second user is determined according to rating records of the first user for media contents and rating records of any second user for media contents. The confidence level of the first user for the second user is different from the confidence level of the second user for the first user. This favorably represents asymmetry of confidence between people in reality. According to the confidence levels of the first user for second users, a recommended media content to be provided to the first user is selected from the media contents that have been rated by second users having high confidence levels, thereby avoiding equivalent impact exerted by symmetry of similarities on recommendation results when related similarity-based recommendation is used.

In addition, according to the media content recommendation method provided by this application, a related user-based similarity-based recommendation algorithm has a low performance in similarity calculation due to sparsity of ratings. As illustrated in Table 1, a similarity between the user $u_1$ and the user $u_2$ obtained by using a Pearson's coefficient similarity calculation formula is greater than that between the user $u_2$ and the user $u_3$. As can be seen from the foregoing table, there are a relative large number of media contents that have been rated by both the user $u_2$ and the user $u_3$ and that have similar rating values. Moreover, one media content has been rated by both the user $u_1$ and the user $u_2$, and their rating values are both 5. Although the rating values are the same, there is no media content having similar ratings in the other media contents. Thus, it is more appropriate that the similarity between the user $u_2$ and the user $u_3$ is greater than that between the user $u_1$ and the user $u_2$. A major reason why a relatively large deviation occurs in calculation is that there is few items that have been rated by both the user $u_1$ and the user $u_2$, and sparsity of data results in high randomness in a calculated similarity. However, according to the media content recommendation method provided by this application, a recommendation is made based on confidence levels between users. The confidence level of the first user for the second user is related to a proportion of a number of media contents for which ratings provided by the first user and the second user are similar to a number of media contents that have been rated by the first user. In addition, the confidence level of the first user for the second user may be different from the confidence level of the second user for the first user. Therefore, the foregoing problem can be avoided.

In some examples, in step 203, when the confidence levels of the first user for the second users are determined, the following steps knot shown in FIG. 2) are included: performing the following operations for any second user:

Step S11: Determine, according to the rating records, a first number of media contents included in a first set of media contents for which a rating value provided by the second user and a rating value provided by the first user have a difference falling within a predetermined range.

In an embodiment, $(I_{u_k} \cap I_{u_j})'$ is used to represent a set of media contents for which ratings are provided by both a user $u_k$ and the user $u_j$ and that have differential rating values falling within a predetermined range. Rating values falling within a predetermined range means that an absolute value of a difference between rating values provided by two users for the same media content is less than a defined threshold, which is represented by using that a difference between rating values does not exceed δ. The following formula (1) is used to represent a set of media contents for which ratings are provided by both the user $u_k$ and the user $u_j$ and that have differential rating values falling within a predetermined range:

$$(I_{u_k} \cap U_{u_j})' = \{i_m | (w_{k,m} \neq 0) \text{ and } (w_{j,m} \neq 0) \text{ and } (|w_{k,m} - w_{j,m}| \leq \delta)\} \quad (1)$$

$i_m$ represents a media content $i_m$, $W_{k,m}$ represents a rating provided by the user $u_k$ for the media content $i_m$, and $W_{j,m}$ represents a rating provided by the user $u_j$ for the media content $i_m$. In some examples, δ is defined as 2, and may be defined as another value in another example. For example, when δ is defined as 2, in Table 1, a media content having rating values provided by the user $u_1$ and the user $u_2$ falling within the predetermined range is a media content $i_1$, and media contents having rating values provided by the user $u_2$ and the user $u_3$ falling within the predetermined range are media contents $i_1$, $i_4$, $i_5$, $i_6$, and $i_7$. After the first set of media contents having differential rating values provided by users falling within a predetermined range is determined, a number of media contents in the first set of media contents can be further determined.

Step S12: Determine, according to the rating records, a second number of media contents included in a second set of media contents that have been rated by the first user.

In one embodiment, $|I_{u_k}|$ is a cardinal number of a second set of media contents that have been rated by the user $u_k$, that is, a number of media contents that have been rated. For another example, in Table 1, a number of media contents that have been rated by the user $u_1$ is 3, a number of media contents that have been rated by the user $u_2$ is 6, and a number of media contents that have been rated by the user $u_3$ is 6.

Step S13: Determine a support degree of the first user for the second user according to the first number and the second number.

In some examples, a ratio of the first number to the second number is used as the support degree of the first user for the second user.

A support degree $Sup(u_k, u_j)$ of the user $u_k$ for the user $u_j$ is expressed by using the following formula (2):

$$Sup(u_k, u_j) = \frac{|(I_{u_k} \cap I_{u_j})'|}{|I_{u_k}|} \quad (2)$$

In this case, $u_k$ is the first user, that is, a target user to which a media content is recommended, $u_j$ is another user, and $|(I_{u_k} \cap I_{u_j})'|$ represents a number of media contents in a first set of media contents having differential rating values provided by the user $u_k$ and the user $u_j$ falling within a predetermined range. $|I_{u_k}|$ represents a cardinal number of a second set of media contents that have been rated by the user $u_k$, that is, a number of media contents in the second set of media contents.

When the media content providing platform 102 pushes a media content to the user $u_j$, the user $u_j$ is a target user, that is, the first user. In this case, a support degree of the first user $u_j$ for another user $u_k$ needs to be calculated. The support degree of the user $u_j$ for the user $u_k$ is expressed by using the following formula (3):

$$Sup(u_j, u_k) = \frac{|(I_{u_k} \cap I_{u_j})'|}{|I_{u_j}|} \quad (3)$$

It can be found by comparing the formula (2) with the formula (3) that because of the same numerator and different denominators, the support degree of the user $u_k$ for the user $u_j$ is different from the support degree of the user $u_j$ for the user $u_k$. Therefore, an obtained supporting matrix between users (that is asymmetric) is different from a similarity matrix between users that is symmetric matrix.

Step S14: Determine a rating similarity between the second user and the first user according to the rating records.

A similarity can be used to represent a degree of similarity between users, and a rating similarity herein represents a degree of similarity between ratings provided by users for different media contents. The user may rate an accessed and interesting media content, and a higher rating indicates a higher interest value. Generally, a larger number of media contents that have been rated by both users indicates that the users have more similar interests. Common algorithm formulas for calculating a similarity include a cosine similarity, a Pearson's coefficient similarity (Pearson's correlation), and an adjusted cosine similarity.

Step S15: Calculate the confidence level of the first user for the second user according to the support degree and the rating similarity.

A confidence level of the first user for the second user is constructed by using the support degree of the first user for the second user and the rating similarity between the first user and the second user. Because the same similarity is shared between users, and support degrees between the users are different, the confidence levels of the users for each other are also different. The confidence level of the first user for the second user is different from the confidence level of the second user for the first user. This favorably represents asymmetry of confidence between users. Subsequently, a media content is recommended to the first user by using confidence levels of the first user for different second users, thereby avoiding equivalent impact exerted by symmetry of similarities on recommendation results when related similarity-based media content recommendation is used.

In some examples, in step S14, when the determining a rating similarity between the second user and the first user is performed, a Pearson's coefficient similarity is used for calculating a rating similarity between the first user and the second user, and the following steps knot shown in FIG. 2) are mainly included:

Step S21: Search the rating records for a third set of media contents that have been rated by both the second user and the first user and rating values respectively provided by the second user and the first user for media contents in the third set of media contents.

As further illustrated in Table 1, corresponding to the user $u_2$ and the user $u_3$, media contents rated by both the user $u_2$ and the user $u_3$ include $i_1$, $i_4$, $i_5$, $i_6$, and $i_7$, and a formed third set of media contents is $\{i_1, i_4, i_5, i_6, i_7\}$. In addition, Table 1 is searched for ratings provided by the user $u_2$ for the media contents in the set: 5, 5, 4, 5, and 4. Ratings provided by the user $u_3$ for the media contents in the set are 4, 4, 4, 3, and 4.

Step S22: Calculate, according to the rating records, an average rating value of the media contents that have been rated by the first user and an average rating value of the media contents that have been rated by the second user Still as illustrated by the example above, the media contents that have been rated by the user $u_2$ are media contents $i_1$, $i_4$, $i_5$, $i_6$, $i_7$, and $i_8$, and rating values are 5, 5, 4, 5, 4, and 5, so that an average rating value of the media contents that have been rated by the user $u_2$ is 4.67. The media contents that have been rated by the user $u_3$ are media contents $i_1$, $i_2$, $i_4$, $i_5$, $i_6$, and $i_7$, and rating values are 4, 5, 4, 4, 3, and 4, so that an average rating value of the media contents that have been rated by the user $u_3$ is 4.

Step S23: Calculate the rating similarity between the second user and the first user according to the rating values respectively provided by the second user and the first user for media contents in the third set of media contents, the average rating value provided by the first user, and the average rating value provided by the second user.

The rating similarity between the second user and the first user is calculated according to the rating values of the media contents in the third set of media contents that have been rated by both the second user and the first user obtained in step S21, the average rating value provided by the first user for the rated media contents in step S22, and the average rating value provided by the second user for the rated contents.

In some examples, the rating similarity between the second user and the first user is calculated by using the following formula (4):

$$Sim(u_k, u_j) = \frac{\sum_{i \in I_{k,j}} (w_{k,i} - \overline{u_k}) \times (w_{j,i} - \overline{u_j})}{\sqrt{\sum_{i \in I_{k,j}} (w_{k,i} - \overline{u_k})^2} \times \sqrt{\sum_{i \in I_{k,j}} (w_{j,i} - \overline{u_j})^2}} \quad (4)$$

$Sim(u_k, u_j)$ represents a rating similarity between the user $u_k$ and the user $u_j$, $I_{k,j}$ represents a third set of media contents that has been rated by both the user $u_k$ and the user $u_j$, $i$ represents a media content in the third set of media contents, $w_{k,i}$ represents a rating value provided by the user $u_k$ for the media content i, $w_{j,i}$ represents a rating value provided by the user $u_j$ for the media content i, $\overline{u_k}$ represents an average rating of media contents that have been rated by the user $u_k$, and $\overline{u_j}$ represents an average rating of media contents that have been rated by the user $u_j$.

In some examples, the confidence level of the first user for the second user is calculated by using the following formula (5):

$$Conf(u_k, u_j) = \frac{2 * Sup(u_k, u_j) * Sim(u_k, u_j)}{Sup(u_k, u_j) + Sim(u_k, u_j)} \quad (5)$$

$Sup(u_k, u_j)$ is a support degree of the user $u_k$ for the user $u_j$, for example, calculated with the formula (2) for. $Sim(u_k, u_j)$ is a rating similarity between the user $u_k$ and the user $u_j$, for example, calculated with the formula (4). A value of the confidence level is a value between 0 and 1. Herein, the user $u_k$ is the first user, and the user $u_j$ is the second user.

When a media content is recommended to the user $u_j$, the user $u_j$ is the first user, and the user $u_k$ is the second user, so that a confidence level of the user $u_j$ for the user $u_k$ is calculated by using the following formula (6):

$$Conf(u_j, u_k) = \frac{2 * Sup(u_j, u_k) * Sim(u_j, u_k)}{Sup(u_j, u_k) + Sim(u_j, u_k)} \quad (6)$$

$Sup(u_j, u_k)$ is a support degree of the user $u_j$ for the user $u_k$, for example, calculated with the formula (3). $Sim(u_j, u_k)$ is the same as $Sim(u_k, u_j)$, and is a rating similarity between the user $u_k$ and the user $u_j$, for example, calculated with the formula (4).

The formula (5) is compared with the formula (6). Because $Sup(u_k, u_j)$ and $Sup(u_j, u_k)$ are not necessarily equal, the confidence level of the user $u_k$ for the user $u_j$ is not necessarily equal to the confidence level of the user $u_j$ for the user $u_k$. To be specific, confidence levels of two users are different between the two users for which the confidence level are calculated. Compared with a user similarity matrix, a user confidence level matrix obtained according to the formula (5) or (6) better reflects the correlation between users.

In some examples, in step 205, when a recommended media content to be provided to the first user is determined in media contents that have been rated by a plurality of second users corresponding to the selected plurality of confidence levels, the following steps knot shown in FIG. 2) are included:

Step S31: Select a fourth set of media contents that have not been accessed by the first user in the media contents that have been rated by the plurality of second users corresponding to the selected plurality of confidence levels.

In an embodiment, according to the determined plurality of second users, media contents that have been rated by the plurality of second users are determined, and in addition, media contents that have not been accessed by the first user are selected from the media contents to form a fourth set of media contents. A set of the media contents that have not been accessed by the first user (the fourth set of media contents) in the media contents that have been rated by the plurality of second users are determined herein according to the media contents that have been accessed by the first user and that are recorded in the user access record database 104. Each of the second users is a selected second user for which a confidence level of the first user is relatively high. A media content rated by the selected second users is recommended to the first user. In addition, when a media content is recommended to the first user, a media content that has been accessed by the first user is no longer recommended, but instead, a media content that has not been accessed by the first user is recommended.

Step S32: Search the rating records for rating values provided by the plurality of second users for media contents in the fourth set of media contents.

In an embodiment, for the set of media contents determined in the foregoing step, the rating records are searched for a rating value provided by each second user in the plurality of second users for each media content in the fourth set of media contents.

Step S33: Determine recommendation degrees of the media contents according to the rating values provided by the plurality of second users for the media contents in the fourth set of media contents.

In an embodiment, for any media content in the fourth set of media contents, a recommendation degree of the media content is determined according to rating values provided by the plurality of second users for the media content. In some examples, the recommendation degree may be an average of ratings provided by the plurality of second users for the media content. In some other examples, ratings provided by the plurality of second users for the media content may be weighted and added, to obtain a recommendation degree of the media content, and weights of the ratings may be derived, for example, from actual experience, or based on the confidence levels, support degrees, and/or similarities. The recommendation degree may alternatively be obtained in another calculation manner in other embodiments.

Step S34: Use a media content having a recommendation degree satisfying a predetermined condition as the recommended media content for the first user.

For example, the predetermined condition may be a specified threshold, and a recommendation degree exceeding the threshold is considered to satisfy the predetermined condition. In some examples, the predetermined condition may alternatively be ranking the calculated recommendation degrees in descending order, and selecting top M recommendation degrees. A media content corresponding to the selected recommendation degree is selected as the recommended media content for the first user.

The media content recommendation method provided by this disclosure is used for testing in a movie rating dataset (Movielength), and good experimental results are obtained. According to accuracy evaluation standards, accuracy of recommended movies is approximately 30%, which is much higher than accuracy of approximately 7% of similarity-based recommendation.

Figure 3:
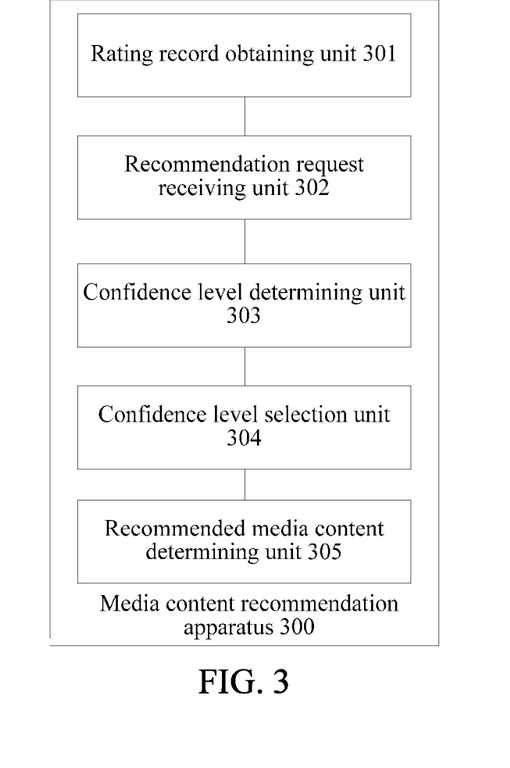
FIG. 3 is a schematic structural diagram of a media content recommendation apparatus according to an embodiment of the disclosure.

This application further provides a media content recommendation apparatus 300, for example, implemented in the application server 103 in the media content providing platform 102. As shown in FIG. 3, the apparatus mainly includes:

a rating record obtaining unit 301, configured to obtain rating records of a plurality of users for different media contents;

a recommendation request receiving unit 302, configured to receive a media content recommendation request of a first user among the plurality of users from an application client;

a confidence level determining unit 303, configured to determine confidence levels of the first user for second users among the plurality of users according to the rating records, the confidence level of the first user for any second user being used for representing an acceptance degree of the first user for rating results of the second user for different media contents.

The apparatus further includes:

a confidence level selection unit 304, configured to select a plurality of confidence levels satisfying a predetermined condition from the determined confidence levels of the first user for the second users;

a recommended media content determining unit 305, configured to determine a recommended media content to be provided to the first user in media contents that have been rated by a plurality of second users corresponding to the selected plurality of confidence levels, and send a link of the determined recommended media content to the application client.

According to the media content recommendation apparatus provided by this application, the confidence level of the first user for the second user is determined according to rating records of the first user for media contents and rating records of any second user for media contents. The confidence level of the first user for the second user is different from the confidence level of the second user for the first user. This favorably represents asymmetry of confidence between people in reality. According to the confidence levels of the first user for second users, a media content that has been rated by a second user having a relatively high confidence level is selected as a recommended media content for the first user, thereby avoiding equivalent impact exerted by symmetry of similarities on recommendation results when related similarity-based recommendation is used.

In addition, according to the media content recommendation apparatus provided by this disclosure, a problem that a related user-based similarity-based recommendation algorithm is not effective in similarity calculation due to sparsity of ratings has been solved. As illustrated in Table 1, a similarity between the user $u_1$ and the user $u_2$ obtained by using a Pearson coefficient similarity calculation formula is greater than that between the user $u_2$ and the user $u_3$. As can be seen from the foregoing table, there are a relative large number of media contents that have been rated by both the user $u_2$ and the user $u_3$ and that have similar rating values. Moreover, one media content has been rated by both the user $u_1$ and the user $u_2$, and their rating values are both 5. Although the rating values are the same, there is no media content having similar ratings in other media contents. Obviously, it is more appropriate that that the similarity between the user $u_2$ and the user $u_3$ is greater than that between the user $u_1$ of the user $u_2$. A major reason why a relatively large deviation occurs in calculation is that there is few items that have been rated by both the user $u_1$ and the user $u_2$, and sparsity of data results in high randomness in a calculated similarity. However, according to the media content recommendation apparatus provided by this disclosure, a recommendation is made based on confidence levels between users. The confidence level of the first user for the second user is related to a proportion of a number of media contents for which ratings provided by the first user and the second user are similar to a number of media contents that have been rated by the first user. In addition, the confidence level of the first user for the second user may be different from the confidence level of the second user for the first user. Therefore, the foregoing problem can be avoided.

In some examples, the confidence level determining unit 303 is configured to:

perform the following operations for any second user:

determining, according to the rating records, a first number of media contents included in a first set of media contents for which a rating value provided by the second user and a rating value provided by the first user have a difference falling within a predetermined range;

determining, according to the rating records, a second number of media contents included in a second set of media contents that have been rated by the first user;

determining a support degree of the first user for the second user according to the first number and the second number;

determining a rating similarity between the second user and the first user according to the rating records; and calculating the confidence level of the first user for the second user according to the support degree and the rating similarity.

In some examples, the confidence level determining unit 303 is further configured to:

search the rating records for a third set of media contents that have been rated by both the second user and the first user and rating values respectively provided by the second user and the first user for media contents in the third set of media contents;

calculate, according to the rating records, an average rating value of the media contents that have been rated by the first user and an average rating value of the media contents that have been rated by the second user; and calculate the rating similarity between the second user and the first user according to the rating values respectively provided by the second user and the first user for media contents in the third set of media contents, the average rating value provided by the first user, and the average rating value provided by the second user.

In some examples, the confidence level determining unit 303 calculates the rating similarity between the second user and the first user by using the following formula (4):

$$Sim(u_k, u_j) = \frac{\sum_{i \in I_{k,j}} (w_{k,i} - \overline{u_k}) \times (w_{j,i} - \overline{u_j})}{\sqrt{\sum_{i \in I_{k,j}} (w_{k,i} - \overline{u_k})^2} \times \sqrt{\sum_{i \in I_{k,j}} (w_{j,i} - \overline{u_j})^2}} \quad (4)$$

$Sim(u_k, u_j)$ represents a rating similarity between a user $u_k$ and a user $u_j$, $I_{k,j}$ represents a third set of media contents that has been rated by both the user $u_k$ and the user $u_j$, i represents a media content in the third set of media contents, $w_{k,i}$ represents a rating value provided by the user $u_k$ for the media content i, $w_{j,i}$ represents a rating value provided by the user $u_j$ for the media content i, $\overline{u_k}$ represents an average rating of media contents that have been rated by the user $u_k$, and $\overline{u_j}$ represents an average rating of media contents that have been rated by the user $u_j$.

In some examples, the confidence level determining unit 303 is further configured to:

use a ratio of the first number to the second number as the support degree of the first user for the second user.

In some examples, the confidence level determining unit 303 calculates the confidence level of the first user for the second user by using the following formula (5):

$$Conf(u_k, u_j) = \frac{2 * Sup(u_k, u_j) * Sim(u_k, u_j)}{Sup(u_k, u_j) + Sim(u_k, u_j)} \quad (5)$$

$Sup(u_k, u_j)$ is a support degree of a user $u_k$ for a user $u_j$, $Sim(u_k, u_j)$ is a rating similarity between the user $u_k$ and the user $u_j$, the user $u_k$ is the first user, and the user $u_j$ is the second user.

In some examples, the recommended media content determining unit 305 is configured to:

select a fourth set of media contents that have not been accessed by the first user in the media content that correspond to the selected plurality of confidence levels and that have been rated by the plurality of second users;

search the rating records for rating values provided by the plurality of second users for media contents in the fourth set of media contents;

determine recommendation degrees of the media contents according to the rating values provided by the plurality of second users for the media contents in the fourth set of media contents; and use a media content having a recommendation degree satisfying a predetermined condition as the recommended media content for the first user.

An embodiment of this disclosure further provides a non-transitory computer-readable storage medium, storing computer-readable instructions executable by a processor to perform the foregoing method.

Figure 4:
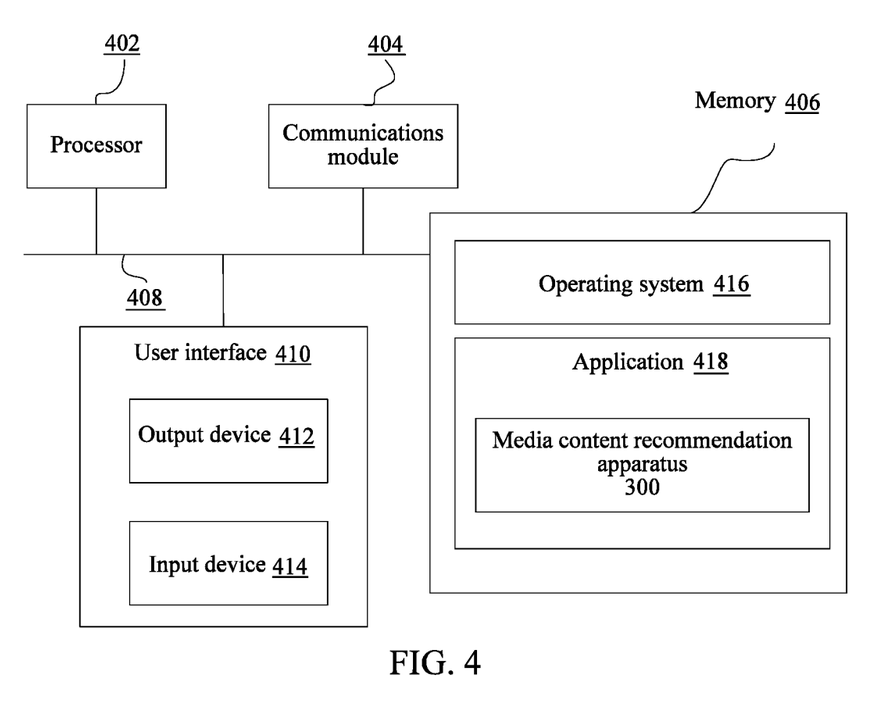
FIG. 4 is a schematic structural composition diagram of a computing device according to an embodiment of the disclosure.

FIG. 4 is a structural composition diagram of a computing device of a media content recommendation apparatus 300. As shown in FIG. 4, the computing device includes processing circuitry such as one or more processors (CPU) 402, a communications module 404, a memory 406, a user interface 410, and a communications bus 408 for interconnecting the components.

The processor 402 may implement network communication and/or local communication by receiving and sending data through the communications module 404.

The user interface 410 includes one or more output devices 412, including one or more speakers and/or one or more visualization displays. The user interface 410 also includes one or more input devices 414, including, for example, a keyboard, a mouse, a voice command input unit or a microphone, a touchscreen display, a touch sensitive input pad, a gesture capturing camera, or other input buttons or controls.

The memory 406 may be a non-transitory computer readable medium, such as a high-speed random access memory such as a DRAM, an SRAM, a DDR RAM, or another random access solid-state storage device; or a non-volatile memory, such as one or more magnetic disk storage devices, optical disk storage devices, flash memory devices, or other non-volatile solid-state storage devices.

The memory 406 stores a set of instructions executable by the processor 402, the set of instructions stored in the memory being configured to be executed by the processor to perform the steps in the media content recommendation method described above in this disclosure while implementing functions of the modules in the media content recommendation apparatus of this disclosure.

The memory 406 includes:

an operating system 416, including programs for processing various basic system services and for executing hardware-related tasks;

an application 418, including various application programs for recommending a media content, where such application programs can implement processing procedures in the foregoing examples, and for example, may include some or all of units or modules in the media content recommendation apparatus 300, at least one of the units or modules in the media content recommendation apparatus 300 may store machine-executable instructions, and by executing the machine-executable instructions in at least one of the units or modules in the memory 406, the processor 402 further implements the function of the at least one module of the foregoing units or modules.

It is noted that not all of the steps and modules in the foregoing procedures and structural diagrams are necessary, and some of the steps or modules may be omitted according to actual requirements. An execution sequence of the steps is not fixed, and may be adjusted as needed. The division of each module is merely for facilitating the division of the function used. During practical implementation, one module can be divided into a plurality of modules. Functions of the plurality of modules can alternatively be implemented by the same module, and these modules may be located in the same device or in different devices.

The hardware modules in various embodiments may be implemented in hardware or a hardware platform plus software. The foregoing software includes machine-readable instructions stored in a non-transitory storage medium. Therefore, the embodiments may alternatively be embodied as software products.

In each embodiment, hardware may be implemented by specific hardware or hardware executing machine-readable instructions. For example, the hardware may be a specifically designed permanent circuit or logic device (for example, a dedicated processor such as an FPGA or ASIC) for performing particular operations. The hardware may alternatively include programmable logic devices or circuits (for example, including general-purpose processors or other programmable processors) temporarily configured by software for performing particular operations.

In addition, each example of this application may be implemented by a data processing program executed by a data processing device such as a computer. Accordingly, the data processing program constitutes this application. In addition, generally, a data processing program stored in a storage medium is directly read from the storage medium for execution or the program is installed on or replicated to a storage device (such as a hard disk or memory) of the data processing device for execution. Therefore, such a storage medium also constitutes this application. This application further provides a non-transitory storage medium storing a data processing program that can be used for performing any one of the foregoing method examples of this application.

Machine-readable instructions corresponding to modules in FIG. 4 may cause an operating system or the like operating on a computer to complete some or all of the operations described herein. The non-transitory computer-readable storage medium may be a memory inserted into an extension board within a computer or a memory disposed in an extension unit connected to the computer. A CPU or the like mounted on an extension board or an extension unit may perform some or all actual operations according to the instructions.

The foregoing descriptions are merely exemplary embodiments of the embodiments of the present disclosure, and are not intended to limit the embodiments of the present disclosure. Any modification, equivalent replacement, improvement, or the like made within the spirit and principle of the embodiments of the present disclosure shall fall within the protection scope of the embodiments of the present disclosure.

What is claimed is:

1. A media content recommendation method, comprising:
receiving, by processing circuitry, rating records of a plurality of users for a plurality of media contents, the rating records including rating values provided by the plurality of users for the plurality of media contents, the plurality of users including a first user and a plurality of second users;
for each combination of the first user and a respective one of the plurality of second users:
determining a first number of media contents of a first set of media contents from the plurality of media contents rated by both the first user and the respective one of the second users according to the rating records, wherein each of the first set of media contents has a rating value difference between a rating value provided by the first user and a rating value provided by the respective one of the second users being within a predetermined rating value difference range;
determining, according to the rating records, a second number of media contents of a second set of media contents that have been rated by the first user, wherein the second set of media contents is from the plurality of media contents; and
determining a support degree of the first user for the respective one of the plurality of second users according to a ratio of the first number of media contents over the second number of media contents;
determining, by the processing circuitry, a confidence level of the first user for each of the plurality of second users based on a combination of:
the support degree of the first user for the respective one of the plurality of second users, and
a rating similarity representing a degree of similarity between rating values of the respective one of the plurality of second users and rating values of the first user for the first set of media contents that have been rated by both the respective one of the plurality of second users and the first user;
selecting a subset of confidence levels satisfying a predetermined condition from determined confidence levels of the first user for each of the plurality of second users, the subset of the confidence levels being associated with a subset of second users of the plurality of second users; and
determining a recommended media content to be provided to the first user from the media contents that have been rated by the subset of second users associated with the subset of the confidence levels.

2. The method according to claim 1, further comprising:
determining, according to the rating records, the first set of the media contents that have been rated by both the respective one of the second users and the first user;
calculating, according to the rating records, a first average rating value of the rating values for the first set of the media contents that has been rated by the first user and a second average rating value of the rating values for the first set of the media contents that has been rated by the respective one of the second users; and
calculating the rating similarity between the respective one of the second users and the first user according to the rating values provided by the respective one of the second users and the first user for the first set of the media contents, and the first and second average rating values.

3. The method according to claim 2, wherein the rating similarity between the respective one of the second users and the first user is calculated by using the following formula:

$$Sim(u_k, u_j) = \frac{\sum_{i \in I_{k,j}} (w_{k,i} - \overline{u_k}) \times (w_{j,i} - \overline{u_j})}{\sqrt{\sum_{i \in I_{k,j}} (w_{k,i} - \overline{u_k})^2} \times \sqrt{\sum_{i \in I_{k,j}} (w_{j,i} - \overline{u_j})^2}}$$

wherein $Sim(u_k, u_j)$ represents the rating similarity between the first user represented by $u_k$ and the respective one of the second users represented by $u_j$, $I_{j,k}$ represents the first set of the media contents that has been rated by both the first user $u_k$ and the second user $u_j$, i represents an index of a media content in the first set of the media contents, $w_{k,i}$ represents a rating value provided by the first user $u_k$ for the media content i, $w_{j,i}$ represents a rating value provided by the respective one of the second users $u_j$ for the media content i, $\overline{u_k}$ represents the first average rating value, and $\overline{u_j}$ represents the second average rating value.

4. The method according to claim 1, wherein the confidence level of the first user for the respective one of the second users is calculated by using the following formula:

$$Conf(u_k, u_j) = \frac{2 * Sup(u_k, u_j) * Sim(u_k, u_j)}{Sup(u_k, u_j) + Sim(u_k, u_j)}$$

wherein Conf($u_k$, $u_j$) represents the confidence level, Sup($u_k$, $u_j$) represents the support degree of the first user represented by $u_k$ for the respective one of the second users represented by $u_j$, Sim($u_k$, $u_j$) is the rating similarity between the first user $u_k$ and the respective one of the second users $u_j$.

5. The method according to claim 1, wherein the determining the recommended media content comprises:
   selecting a third set of the media contents that have not been accessed by the first user from the media contents that have been rated by the subset of the second users;
   determining recommendation degrees of the media contents according to the rating values provided by the subset of the second users for the media contents in the third set of the media contents; and
   selecting a media content from the third set of the media contents having a recommendation degree satisfying a predetermined condition as the recommended media content for the first user.

6. The method according to claim 5, wherein the determining the recommendation degrees comprises:
   determining an average rating value or a weighted average value of the rating values of one of the third set of the media contents provided by the subset of the second users.

7. An apparatus for media content recommendation, comprising processing circuitry configured to:
   receive rating records of a plurality of users for a plurality of media contents, the rating records including rating values provided by the plurality of users for the plurality of media contents, the plurality of users including a first user and a plurality of second users;
   for each combination of the first user and a respective one of the plurality of second users:
      determine a first number of media contents of a first set of media contents from the plurality media contents rated by both the first user and the respective one of the second users according to the rating records, wherein each of the first set of media contents has a rating value difference between a rating value provided by the first user and a rating value provided by the respective one of the second users being within a predetermined rating value difference range;
      determine, according to the rating records, a second number of media contents of a second set of media contents that have been rated by the first user, wherein the second set of media contents is from the plurality of media contents; and
      determine a support degree of the first user for the respective one of the plurality of second users according to a ratio of the first number of media contents over the second number of media contents;
   determine a confidence level of the first user for each of the plurality of second users based on a combination of:
      the support degree of the first user for the respective one of the plurality of second users, and
      a rating similarity representing a degree of similarity between rating values of the respective one of the plurality of second users and rating values of the first user for the first set of media contents that have been rated by both the respective one of the plurality of second users and the first user;
   select a subset of confidence levels satisfying a predetermined condition from determined confidence levels of the first user for each of the plurality of second users, the subset of the confidence levels being associated with a subset of second users of the plurality of second users; and
   determine a recommended media content to be provided to the first user from the media contents that have been rated by the subset of second users associated with the subset of the confidence levels.

8. The apparatus according to claim 7, wherein the processing circuitry is further configured to:
   determine, according to the rating records, the first set of the media contents that have been rated by both the respective one of the second users and the first user;
   calculate, according to the rating records, a first average rating value of the rating values for the first set of the media contents that has been rated by the first user and a second average rating value of the rating values for the first set of the media contents that has been rated by the respective one of the second users; and
   calculate the rating similarity between the respective one of the second users and the first user according to the rating values provided by the respective one of the second users and the first user for the first set of the media contents, and the first and second average rating values.

9. The apparatus according to claim 8, wherein the rating similarity between the respective one of the second users and the first user is calculated by using the following formula:

$$Sim(u_k, u_j) = \frac{\sum_{i \in I_{k,j}} (w_{k,i} - \overline{u_k}) \times (w_{j,i} - \overline{u_j})}{\sqrt{\sum_{i \in I_{k,j}} (w_{k,i} - \overline{u_k})^2} \times \sqrt{\sum_{i \in I_{k,j}} (w_{j,i} - \overline{u_j})^2}}$$

wherein Sim($u_k$, $u_j$) represents the rating similarity between the first user represented by $u_k$ and the respective one of the second users represented by $u_j$, $I_{k,j}$ represents the first set of the media contents that has been rated by both the first user $u_k$ and the second user $u_j$, i represents an index of a media content in the first set of the media contents, $w_{k,i}$ represents a rating value provided by the first user $u_k$ for the media content i, $w_{j,i}$ represents a rating value provided by the respective one of the second users $u_j$ for the media content i, $\overline{u_k}$ represents the first average rating value, and $\overline{u_j}$ represents the second average rating value.

10. The apparatus according to claim 7, wherein the confidence level of the first user for the respective one of the second users is calculated by using the following formula:

$$Conf(u_k, u_j) = \frac{2 * Sup(u_k, u_j) * Sim(u_k, u_j)}{Sup(u_k, u_j) + Sim(u_k, u_j)}$$

wherein Conf($u_k$, $u_j$) represents the confidence level, Sup($u_k$, $u_j$) represents the support degree of the first user represented by $u_k$ for the respective one of the second users represented by $u_j$, Sim($u_k$, $u_j$) is the rating similarity between the first user $u_k$ and the respective one of the second users $u_j$.

11. The apparatus according to claim 7, wherein the processing circuitry is further configured to:

select a third set of the media contents that have not been accessed by the first user from the media contents that have been rated by the subset of the second users;
determine recommendation degrees of the media contents according to the rating values provided by the subset of the second users for the media contents in the third set of the media contents; and
select a media content from the third set of the media contents having a recommendation degree satisfying a predetermined condition as the recommended media content for the first user.

12. The apparatus according to claim 11, wherein the processing circuitry is further configured to:
determine an average rating value or a weighted average value of the rating values of one of the third set of the media contents provided by the subset of the second users.

13. A non-transitory computer-readable medium storing a program executable by a processor to perform a method of media content recommendation, the method comprising:
receiving rating records of a plurality of users for a plurality of media contents, the rating records including rating values provided by the plurality of users for the plurality of media contents, the plurality of users including a first user and a plurality of second users;
for each combination of the first user and a respective one of the plurality of second users:
determining a first number of media contents of a first set of media contents from the plurality of media contents rated by both the first user and respective one of the second users according to the rating records, wherein each of the first set of media contents has a rating value difference between a rating value provided by the first user and a rating value provided by the respective one of the second users being within a predetermined rating value difference range;
determining, according to the rating records, a second number of media contents of a second set of media contents that have been rated by the first user, wherein the second set of media contents is from the plurality of media contents; and
determining a support degree of the first user for the respective one of the plurality of second users according to a ratio of the first number of media contents over the second number of media contents;
determining a confidence level of the first user for each of the plurality of second users based on a combination of:
the support degree of the first user for the respective one of the plurality of second users, and
a rating similarity representing a degree of similarity between rating values of the respective one of the plurality of second users and rating values of the first user for the first set of media contents that have been rated by both the respective one of the plurality of second users and the first user;
selecting a subset of confidence levels satisfying a predetermined condition from determined confidence levels of the first user for each of the plurality of second users, the subset of the confidence levels being associated with a subset of the second users of the plurality of second users; and
determining a recommended media content to be provided to the first user from the media contents that have been rated by the subset of second users associated with the subset of the confidence levels.

14. The non-transitory computer-readable medium of claim 13, wherein the method further comprises:
determining, according to the rating records, the first set of the media contents that have been rated by both the respective one of the second users and the first user;
calculating, according to the rating records, a first average rating value of the rating values for the first set of the media contents that has been rated by the first user and a second average rating value of the rating values for the first set of the media contents that has been rated by the respective one of the second users; and
calculating the rating similarity between the respective one of the second users and the first user according to the rating values provided by the respective one of the second users and the first user for the first set of the media contents, and the first and second average rating values.

15. The non-transitory computer-readable medium of claim 14, wherein the rating similarity between the respective one of the second users and the first user is calculated by using the following formula:

$$Sim(u_k, u_j) = \frac{\sum_{i \in I_{k,j}} (W_{k,i} - \overline{u_k}) \times (W_{j,i} - \overline{u_j})}{\sqrt{\sum_{i \in I_{k,j}} (W_{k,i} - \overline{u_k})^2} \times \sqrt{\sum_{i \in I_{k,j}} (W_{j,i} - \overline{u_j})^2}}$$

wherein $Sim(u_k, u_j)$ represents the rating similarity between the first user represented by $u_k$ and the respective one of the second users represented by $u_j$, $I_{k,j}$ represents the first set of the media contents that has been rated by both the first user $u_k$ and the second user $u_j$, i represents an index of a media content in the first set of the media contents, $w_{k,i}$ represents a rating value provided by the first user $u_k$ for the media content i, $w_{j,i}$ represents a rating value provided by the respective one of the second users $u_j$ for the media content i, $\overline{u_k}$ represents the first average rating value, and $\overline{u_j}$ represents the second average rating value.

16. The non-transitory computer-readable medium of claim 13, wherein the confidence level of the first user for the respective one of the second users is calculated by using the following formula:

$$Conf(u_k, u_j) = \frac{2 * Sup(u_k, u_j) * Sim(u_k, u_j)}{Sup(u_k, u_j) + Sim(u_k, u_j)}$$

wherein $Conf(u_k, u_j)$ represents the confidence level, $Sup(u_k, u_j)$ represents the support degree of the first user represented by $u_k$ for the respective one of the second users represented by $u_j$, $Sim(u_k, u_j)$ is the rating similarity between the first user $u_k$ and the respective one of the second users $u_j$.

17. The non-transitory computer-readable medium of claim 13, wherein the determining the recommended media content comprises:
selecting a third set of the media contents that have not been accessed by the first user from the media contents that have been rated by the subset of the second users;
determining recommendation degrees of the media contents according to the rating values provided by the subset of the second users for the media contents in the third set of the media contents; and selecting a media content from the third set of the media contents having a recommendation degree satisfying a predetermined condition as the recommended media content for the first user.

18. The non-transitory computer-readable medium of claim 17, wherein the determining the recommendation degrees comprises:
determining an average rating value or a weighted average value of the rating values of one of the third set of the media contents provided by the subset of the second users.

* * * * *